No. 637,999. Patented Nov. 28, 1899.
J. ASHCRAFT.
HARROW.
(Application filed June 28, 1899.)
(No Model.) 2 Sheets—Sheet 1.

Witnesses
Howard D. Orr
N. F. Bernhard

Jacob Ashcraft, Inventor
By his Attorneys,
C. A. Snow & Co.

No. 637,999. Patented Nov. 28, 1899.
J. ASHCRAFT.
HARROW.
(Application filed June 28, 1899.)
(No Model.) 2 Sheets—Sheet 2.

Witnesses
Howard D. Orr.
H. J. Bernhof.

Jacob Ashcraft, Inventor
By his Attorneys,
C. A. Snow & Co.

THE NORRIS PETERS CO., PHOTO-LITHO., WASHINGTON, D. C.

UNITED STATES PATENT OFFICE.

JACOB ASHCRAFT, OF FRAZEYSBURG, OHIO.

HARROW.

SPECIFICATION forming part of Letters Patent No. 637,999, dated November 28, 1899.

Application filed June 28, 1899. Serial No. 722,157. (No model.)

*To all whom it may concern:*

Be it known that I, JACOB ASHCRAFT, a citizen of the United States, residing at Frazeysburg, in the county of Muskingum and State of Ohio, have invented a new and useful Harrow, of which the following is a specification.

My invention relates to improvements in wheeled harrows; and the object in view is to provide a simple and compact implement by which the clods may be crushed and the ground thoroughly pulverized to reduce it to a good condition for planting grain.

In my implement a wheeled frame is provided for the accommodation of the driver's seat and the several operative elements of the structure. One element is a crushing-frame hung on the wheeled frame and formed by a series of crushing-bars and carrying a series of pivoted teeth adapted to coact with the bars in crushing the clods, and this main frame and the pivoted teeth are adjustable independently by suitable levers. On the pivot for the crushing-frame is hung another frame which carries a shaft that is equipped with revoluble toothed heads, and this head-carrying frame is connected operatively with the lever by which the toothed heads may be raised above the crushing-bars. The crushing-frame and the head-carrying frame are adapted to be raised simultaneously with relation to the wheeled frame for the purpose of moving the operating elements above the ground-line and enabling the machine to be transported to or from the field without permitting the teeth to touch the soil.

The invention consists in the novel combination of elements and in the construction and arrangement of parts which will be hereinafter fully described and claimed.

To enable others to understand the invention, I have illustrated the preferred embodiment thereof in the accompanying drawings, forming a part of this specification, and in which—

Figure 1:
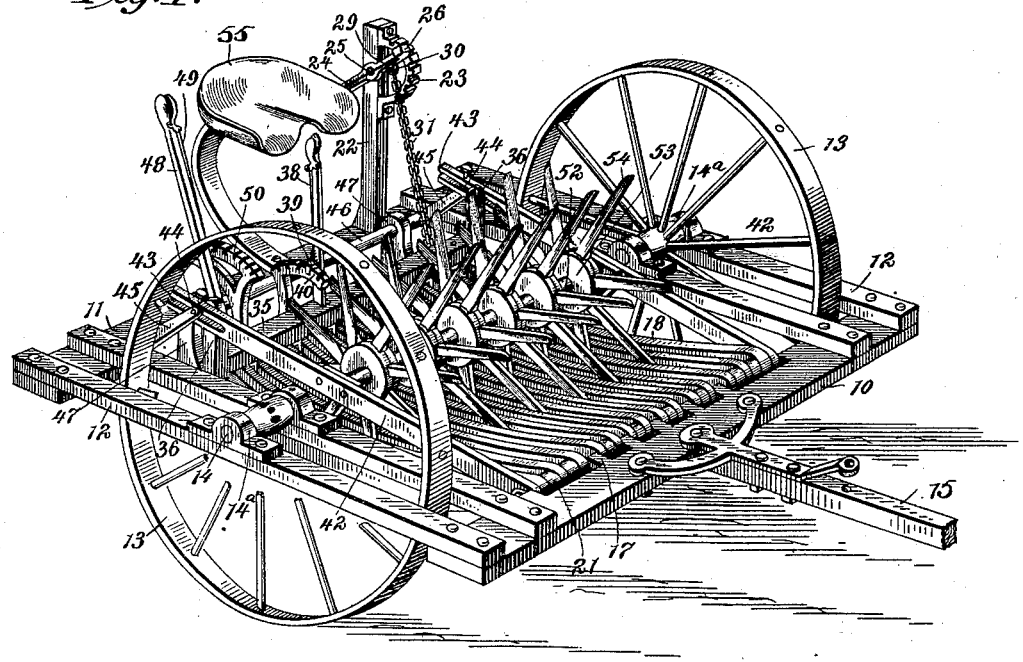
Figure 5:
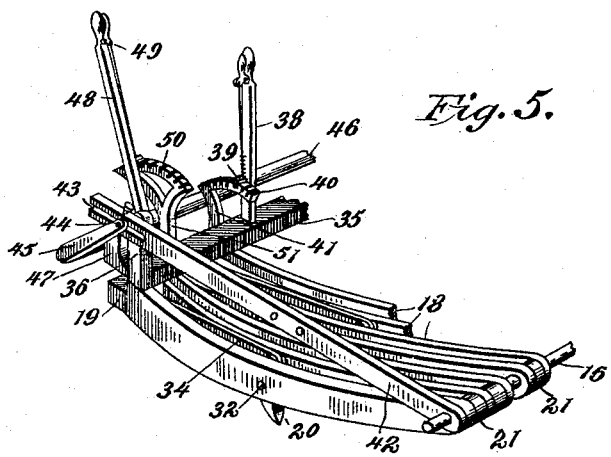
Figure 2:
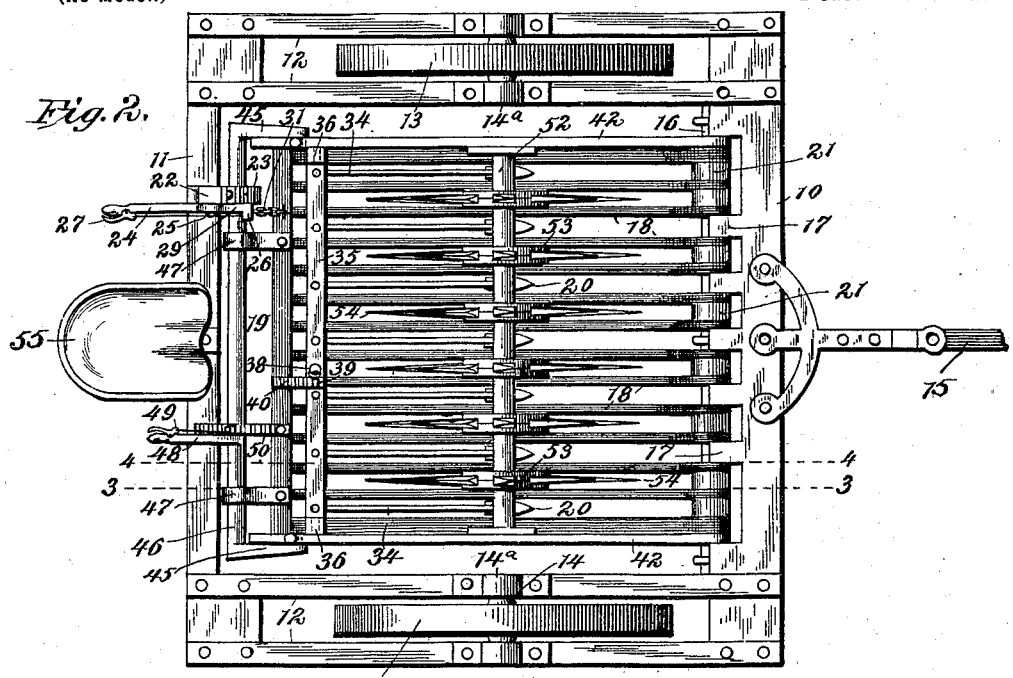
Figure 3:
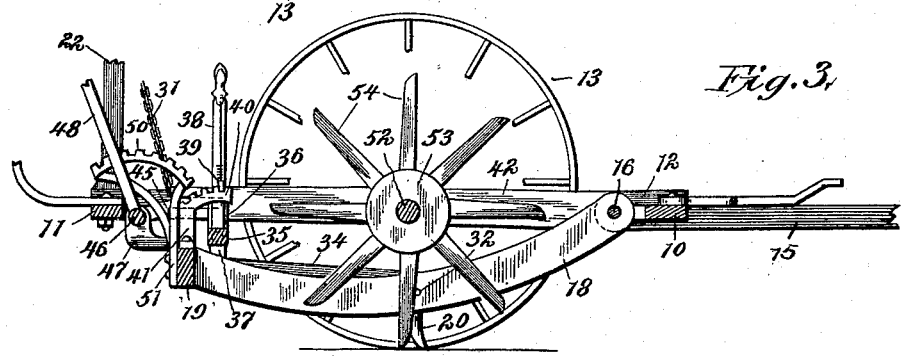
Figure 4:
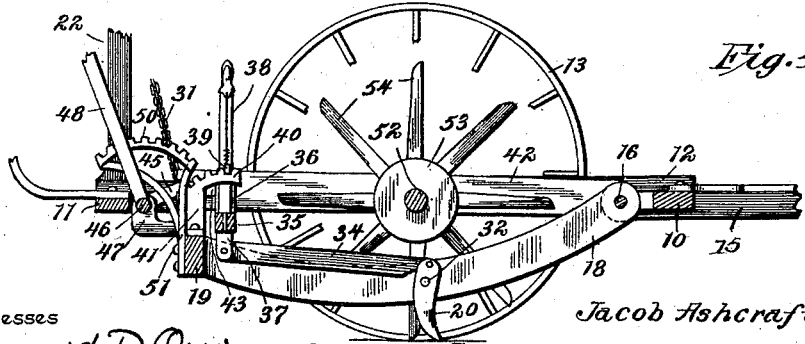

Figure 1 is a perspective view of a harrow constructed in accordance with my invention and showing the head-carrying frame raised out of operative relation to the ground. Fig. 2 is a plan view. Fig. 3 is a longitudinal section with the parts lowered to their operative positions and on the plane indicated by the dotted line 3 3 of Fig. 2. Fig. 4 is a similar sectional view on the plane indicated by the dotted line 4 4 of Fig. 2. Fig. 5 is a detail perspective view of the clod-crushing frame and the parts associated therewith.

The same numerals of reference are used to indicate like and corresponding parts in each of the several figures of the drawings.

The wheeled frame of my improved harrow consists of the front rail 10, the rear rail 11, and two pairs of side bars 12, which are joined firmly to the front and rear rails and produce a substantially rigid construction. The carrying-wheels 13 are disposed in the spaces between the pairs of side bars, and said wheels are mounted on axles 14, which are fitted in bearings $14^a$, provided on the side bars 12. The draft-tongue 15 is secured in any approved way to the front rail 10 of the wheeled frame. This front rail of the wheeled frame supports the horizontal pivotal rod 16, which is disposed transversely across the machine within the side bars 12 thereof, and said front rail 10 is furthermore provided with pairs of lugs 17, which extend rearwardly from the rail toward the pivotal rod 16. The pivotal rod furnishes the support for the front end of the clod-crushing frame and the head-carrying frame, so that the two frames are mounted on a common pivotal connection with the main frame; but it will be evident that the frames may be supported by separate or independent pivots within the province of a skilled constructor.

The clod-crushing frame consists of a plurality of longitudinal curved bars 18, a rear cross-rail 19, and a series of teeth 20. The longitudinal curved bars are arranged in parallel relation, so as to occupy the same positions throughout the width of the frame, and the lower convex edges of these bars are presented to the ground for the purpose of assisting the teeth 20 in crushing the clods. The rear rail 19 is united firmly to the rear ends of the longitudinal bars 18, and the front ends of these bars are fitted loosely on the pivotal rod 16. Said front ends of the curved bars 18 are spaced at proper distances apart by the employment of collars 21, which are threaded loosely on the pivotal rod in the intervals between the bars 18, and said bars are disposed in groups or pairs between the lugs 17 on the rail 10 of the wheeled frame, whereby the lugs and the collars coact in spacing the bars 18 at proper distances from each other; but the crushing-frame as an entirety is free to be adjusted in a vertical direction on the horizontal axis afforded by the pivotal rod 16. By mounting the front ends of the bars on the pivotal rod and spacing them apart in the manner described and by fastening the rear rail 19 firmly to the opposite ends of the curved bars the bars are held in parallel positions and at proper distances apart under all conditions of service, and thus the teeth on the revoluble heads and the teeth 20 are adapted to play or move freely in the space between the crushing-bars.

The crushing-frame is designed to be raised out of operative position in transporting the machine from one place to another, and to lower the frame into working position I provide an adjusting appliance which is supported by the wheeled frame and is connected operatively to the rear end of the crushing-frame. A post 22 is fixed to the rail 11 of the wheeled frame, and said post is provided with a notched segment 23. An adjusting-lever 24 is fulcrumed, as at 25, on the post 22 in a position concentric with the arc of the segment 23, and said lever 24 carries a latch 26, which is controlled by a grip-lever 27, that is mounted on said lever 24, the latch being disposed on the lever 24 to engage with the notched segment 23. The operative lever 24 is equipped with a short arm 29, to which is fitted a link 30, and from this link extends the connecting chain or cable 31, which is fastened to the rear rail 19 of the crushing-frame. By moving the lever 24 in one direction the crushing-frame may be raised for its curved bars and the teeth 20 to clear the ground, and the lever and frame are held in their adjusted positions by the engagement of the latch 26 with the segment. A reverse adjustment of the lever operates to lower the crushing-frame to bring its bars and the teeth into working position, and the crushing-frame may be raised or lowered, more or less, as desired, by the operator and required by the nature of the ground, the frame being maintained in its proper position by the latch engaging with the segment. The teeth 20 are arranged in alternate spaces formed by and between the curved crushing-bars 18, and these teeth are mounted on the crushing-frame for adjustment independently of the raising and lowering of the crushing-frame in its entirety. Each tooth 20 is pivoted at a point intermediate of its length by a pin 32, which is supported by adjacent bars 18, and the upper end of said tooth 20 is forked or bifurcated to extend above the crushing-bars. To the forked upper end of each tooth is connected a pitman 34, and the series of pitmen from the series of pivoted teeth 20 extend rearwardly for operative connection to a rock-shaft 35, which is common to all the pitmen. This rock-shaft is disposed in a position across the crushing-frame near the rear rail 19 thereof, and the ends of said shaft are mounted or journaled in short posts 36, which are secured firmly to the bars 18 at the ends of the crushing-frame. The rock-shaft 35 carries a series of depending arms 37, to which are pivotally connected the rear ends of the pitmen 34, and to said rock-shaft is firmly secured an adjusting-lever 38. This adjusting-lever carries a latch 39, adapted to engage with a notched arc 40 on a short post 41, which is secured firmly to the rear rail 19 of the crushing-frame, and thus the rock-shaft may be held by the lever and latch connections at any point of its adjustment with reference to the crushing-frame. It is evident that the lever 38 may be thrown in a forward direction to make the pitman incline the pivoted teeth forwardly and downwardly with reference to the crushing-frame; but a reverse adjustment of this lever turns the shaft to move the pivoted teeth 20 to vertical positions or to rearwardly-inclined positions, thus regulating the position of the teeth with reference to the ground-line and determining the penetration of said teeth.

My machine also contemplates the employment of a series of revoluble heads, which are carried by a frame consisting of side bars 42 and a means for adjusting said side bars. The front ends of the side bars are pivoted on the rod 16, adjacent to the end bars 18 of the crushing-frame, and the rear ends of said side bars are provided with longitudinal slots 43, which receive the studs or pins 44 on the arms 45 of a rock-shaft 46. This rock-shaft is arranged across the wheeled frame in rear of the rail 19 of the crushing-frame, and said shaft is mounted in bearings 47, which are secured firmly to said rail 19. The rock-shaft 46 has a lever 48 secured firmly thereto, and this lever is equipped with a latch 49 to engage with a notched arc 50 on a short post 51, which is fastened firmly to the rear rail of the crushing-frame. The side bars 42, which constitute the head-frame support, the arbor or shaft 52, which is mounted in said side bars 42 at points intermediate of their length. The shaft or arbor 52 carries a series of heads or disks 53, that are fast with the shaft to rotate therewith, and each head 53 has a series of radial spikes or teeth 54, which protrude a sufficient distance from the shaft to enter the ground. The teeth of the revoluble heads on the shaft 52 work in alternate spaces between the curved bars 18, which constitute the crushing-frame, and in the intermediate spaces of the crushing-bars are the pivoted teeth 20, which are arranged, preferably, to lie below the shaft 52. It will thus be seen that the two series of pivoted and rotary teeth are mounted on the implement to act on the ground at substantially the same transverse line of the wheeled frame, and the teeth are thus caused to thoroughly crush the clods and pulverize the soil.

The implement is equipped with a seat 55, which is mounted on a standard secured to the rear rail 11 of the wheeled frame, and this seat is disposed in a position which will enable the operator or driver to easily grasp either of the series of three levers 24 38 48.

From the foregoing description it will be seen that the crushing-frame and the head-carrying frame are pivoted on a common rod and that the crushing-frame supports the devices by which the series of pivoted teeth may be raised or lowered and the devices for adjusting the frame 42 and the series of revoluble heads which are supported by the shaft 52, that is mounted in the frame 42. From this construction and arrangement of parts it follows that an adjustment of the lever 24 by the operator serves to raise or lower the crushing-frame, and with it the teeth 20 and the revoluble toothed heads 53. The operating devices of the implement may thus be raised above the ground to make the teeth free from contact therewith on transporting the machine to and from the field or from one field to another; but to throw the implement into operation it is only necessary to adjust the lever 24 in a direction to lower the crushing-frame and all parts associated therewith. The lever 38 may be turned by the driver to regulate the position of the pivoted teeth relatively to the bars of the crushing-frame, and this adjustment of the pivoted teeth may be effected independently of any adjustment of the crushing-frame itself or of the frame 42, which carries the revoluble toothed heads. In like manner the lever 48 may be adjusted by the driver to raise or lower the bars 42 to correspondingly affect the shaft and the series of revoluble heads thereon, such adjustment of the toothed heads 53 being effected without disturbing the position of the crushing-frame or the pivoted teeth.

In the practical service of the implement the crushing-bars 18 crush the clods, while the teeth 20 and the teeth 54 of the revoluble heads serve to pulverize the ground. Under some conditions of service it is desirable to raise the revoluble teeth out of operation, and this may easily be effected by moving the lever 48.

Changes in the form, proportion, size, and the minor details of construction within the scope of the appended claims may be resorted to without departing from the spirit or sacrificing any of the advantages of this invention.

What I claim is—

1. In a harrow, the combination with a wheeled frame, of a crushing-frame hung therein and provided with a series of adjustable teeth, a head-carrying frame also hung to the wheeled frame and supporting the toothed shaft, and independent adjusting contrivances connected with the wheeled frame and the crushing-frame for moving the crushing-frame and the head-carrying frame independently with relation to the wheeled frame, substantially as described.

2. In a harrow, the combination with a wheeled frame, of a crushing-frame hung to said wheeled frame, a series of teeth pivoted to the crushing-frame, a lever mounted on the crushing-frame and connected with said teeth for adjusting the latter with reference to said crushing-frame, another lever hung on the wheeled frame and connected to the crushing-frame for raising or lowering the same, a head-carrying frame hung to the wheeled frame, a shaft mounted in the head-carrying frame and provided with a series of spiked heads which are disposed alternately with relation to the teeth on the crushing-frame, and means for adjusting the head-carrying frame independently of the crushing-frame, substantially as described.

3. In a harrow, the combination with a wheeled frame, of a crushing-frame consisting of a series of curved bars united firmly together and hung at their front ends on the wheeled frame, means for adjusting the crushing-frame with relation to the wheeled frame, adjustable teeth hung on the bars of the crushing-frame, and an adjusting device supported by the crushing-frame and connected with the series of adjustable teeth, for the purpose described, substantially as described.

4. In a harrow, the combination with a wheeled frame, of a series of curved bars united together to form a crushing-frame and pivotally connected to the wheeled frame, means supported by the wheeled frame and connected to the crushing-frame for adjusting the latter, a series of teeth connected to the bars of the crushing-frame, a rock-shaft journaled on the crushing-frame and having a lever and locking contrivances, and pitmen pivotally connected to the rock-shaft and the series of teeth, substantially as described.

5. In a harrow, the combination with a wheeled frame, of a pivotal rod supported by said frame, a series of curved bars forming a crushing-frame and hung loosely on the pivotal rod, spacing devices coacting with said rod and the series of bars for maintaining the latter in spaced parallel relation, adjustable teeth pivoted on the bars of the crushing-frame, adjusting devices supported by the crushing-frame and connected operatively with said adjustable teeth, and means supported by the wheeled frame for adjusting the crushing-frame with relation thereto, substantially as described.

6. In a harrow, the combination with a wheeled frame, of a crushing toothed frame supported therein, a head-carrying frame having its side bars hung to the main frame for adjustment with relation to the crushing-frame, a shaft journaled in the head-carrying frame and provided with a series of revoluble spiked heads, and a rock-shaft having link connections with the head-carrying frame, substantially as described.

7. In a harrow, the combination with a wheeled frame, and a toothed crushing-frame carried thereby, of side bars pivoted to the wheeled frame and having the slotted rear ends, a rock-shaft journaled on the crushing-frame and provided with arms which are connected operatively to the slotted ends of the pivoted side bars, a lever on said rock-shaft and carrying a latch device adapted to engage with a segment on the crushing-frame, and a shaft mounted in the side bars and carrying spiked heads, substantially as described.

8. In a harrow, the combination with a wheeled frame, of a pivotal rod supported by the wheeled frame at its front end, a crushing-frame hung on said rod, an adjusting-lever carried by the wheeled frame and connected operatively to the crushing-frame, a series of pivoted teeth mounted on the bars of the crushing-frame, a rock-shaft supported by the crushing-frame and having link connections to said pivoted teeth, side bars hung on the pivotal rod at the respective ends of the crushing-frame, a rock-shaft journaled on the crushing-frame and having linked connections with the side bars, and a shaft journaled in the side bars and carrying revoluble heads provided with teeth arranged alternately to the pivoted teeth of the crushing-frame, substantially as described.

In testimony that I claim the foregoing as my own I have hereto affixed my signature in the presence of two witnesses.

JACOB ASHCRAFT.

Witnesses:
W. D. PACKARD,
WHEELER ASHCRAFT.